United States Patent [19]

Siard

[11] Patent Number: 4,472,129
[45] Date of Patent: Sep. 18, 1984

[54] HEAD FOR EXTRUSION OF A TUBULAR PARISON FORMED OF AT LEAST ONE LAYER OF MATERIAL

[75] Inventor: Michel Siard, Sainte-Adresse, France

[73] Assignee: Compagnie Francaise de Raffinage, Paris, France

[21] Appl. No.: 365,258

[22] Filed: Apr. 5, 1982

[30] Foreign Application Priority Data

Apr. 9, 1981 [FR] France ................................ 8107125

[51] Int. Cl.³ .............................................. B29F 3/04
[52] U.S. Cl. ................................... 425/381; 264/541;
425/376 A; 425/465; 425/466; 425/467
[58] Field of Search ................. 425/381, 465, 466, 467,
425/380, 376 A; 264/540, 541

[56] References Cited

U.S. PATENT DOCUMENTS

| | | | |
|---|---|---|---|
| 2,349,178 | 5/1944 | Kopitke | 425/532 |
| 2,824,337 | 2/1958 | Covington, Jr. et al. | 425/466 |
| 3,078,507 | 2/1963 | Park | 264/541 |
| 3,111,714 | 11/1963 | Branscum | 425/466 |
| 3,184,792 | 5/1965 | Commisso | 425/467 |
| 3,302,240 | 2/1967 | Loos | 425/467 |
| 3,309,443 | 3/1967 | Scott, Jr. et al. | 264/541 |
| 3,332,112 | 7/1967 | Park | 425/380 |
| 3,382,539 | 5/1968 | Zehr | 425/381 |
| 3,453,690 | 7/1969 | Mayner | 425/381 |
| 3,753,636 | 8/1973 | Waterloo | 425/146 |
| 3,856,448 | 12/1974 | Iijima et al. | 425/381 |
| 3,899,276 | 8/1975 | Sokolow | 425/376 A |
| 4,047,868 | 9/1977 | Kudo et al. | 425/462 |
| 4,111,630 | 9/1978 | Shiomi et al. | 425/462 |
| 4,171,195 | 10/1979 | Klein et al. | 425/381 |

FOREIGN PATENT DOCUMENTS

| | | | |
|---|---|---|---|
| 2536851 | 2/1977 | Fed. Rep. of Germany | 425/462 |
| 2314048 | 6/1976 | France | |
| 46-11988 | 3/1971 | Japan | 425/467 |

Primary Examiner—Jeffery R. Thurlow

[57] ABSTRACT

Improved extrusion head for use in forming plastic containers or tubular films (optionally with multi-ply walls) by the extrusion-blowing process. The typical extrusion head used in this process has flat compensating rings bounding a portion of the frustoconical flow passages which ultimately feed the extrusion orifice. These are replaced by spherical segmental rings having a beveled surface in the form of a spherical, conical, toric or ogival shape which bounds said flow passage and thus eliminates stagnating recesses (of the type encountered through use of the prior art flat rings).

17 Claims, 14 Drawing Figures

HEAD FOR EXTRUSION OF A TUBULAR PARISON FORMED OF AT LEAST ONE LAYER OF MATERIAL

The present invention relates to an extrusion head for the extrusion of a tubular parison, formed of at least one layer of material, in the manufacture of hollow objects or tubular films.

It is known to package products which are sensitive to light and to gases, and particularly food products, in hollow containers or films whose walls are formed of one or more layers of different polymers or of the same polymer but with different fillers. For example, containers and films are thus produced which are formed of a polyamide layer for protection against gases and/or of a polyethylene layer which is opaque to light.

Such containers and films are produced by the well-known extrusion-blowing process. The extrusion head used in this process is formed of a stack of internally circular and externally circular or polygonal fixed annular flanges whose center bore is axially traversed by a torpedo to which are secured a mandrel support and a mandrel of a section which normally is smaller than that of said bore but which, in special applications, may be equal to or larger than that of the bore.

At least one tubular frustoconical passage is provided between the flanges for the flow of a sheet of polymer toward the tubular channel between the torpedo and the inner peripheral walls of the flanges. In the case of production of multi-layer containers or films, several frustoconical passages are formed at different levels from the head to permit the flow of different polymers toward said tubular channel, a new layer of material being added at each tubular-channel section between two adjacent frustoconical passages to the layers from preceding sections.

Since the polymeric material of each layer arrives radially from just one side, the material usually is poorly distributed around the torpedo, with the material tending to concentrate preferentially on the side of the torpedo opposite the point where the layer enters the tubular channel. This results in defective containers and films wherein the thickness of the layers varies from one point to the next.

A known expedient for overcoming this drawback is to insert in each of the flanges which externally bound the frustoconical passage or passages a ring provided with a frustoconical inner edge which when the ring is centered on the axis of the torpedo is complementary to the frustoconical wall of said flange, lateral centering means such as radial screws being provided for adjusting the radial position of the ring.

When it is observed that the thickness of the layer or of one of the layers of the parison emerging from the extruder varies peripherally, the ring associated with said layer is moved off center, with respect to the axis of the head, by shifting it in a direction opposed to that from which the material arrives.

The same radial-screw arrangement is used to adjust the extrusion die. However, in this case no ring is used; rather, the die itself is displaced relative to the mandrel. This adjustment has a definite effect on the straightness of the extruded parison.

However, such a coextrusion head poses problems of two kinds:

1. Adustment of the dies.

(a) Adjustment is empirical and its precision depends on the skill of the operator.

(b) In high-speed automatic machines, the elements to be reached for making the adjustment, for example, the adjusting screws, are often inaccessible while the machine is in operation, mainly because of the passage of the molds under the extrusion head, which results in machine stoppages that militate against full utilization of the machine and are detrimental to precise adjustment.

(c) The stability of the adjustment is not constant. It is affected particularly by variations in the rheological properties of the material, which may be the result of thermal modulations due to the action of the adjusting means, the proportion of recycled material, or other causes. It follows that continuous monitoring, often effected a posteriori on the molded articles, is necessary.

(d) When work is resumed after a prolonged stoppage, the preceding three requirements are particularly onerous and make it necessary to stagger the restarting times of the various machines to permit the adjusters to respond to the limitations imposed by each of them.

2. Behavior of the material.

On the extrusion head described above, the centering ring or rings and the extrusion die are bounded by flat bearing surfaces perpendicular to the general axis of the head. Because of this arrangement, when a ring is moved off center with respect to the axis of the head, setbacks forming sharp corners appear in the path of the material. These setbacks have the disadvantage of forming dead spaces in which the material is held up long enough to undergo thermal degradation. The degraded material appears on the surface of the molded articles as unattractive streaks or sporadically forms a stepped pattern, especially during adjustments by means of screws, with the result that "black spots" form and the molded products have to be discarded.

The present invention has as its object to overcome all these drawbacks, and to this end it relates to an extrusion head of the type formed by a stack of annular, internally circular flanges which are centered on the same axis and whose center bore is axially traversed with play by a torpedo having as an extension a mandrel support which serves to support and guide a mandrel, the flow of the material or of the different materials to be extruded toward the tubular channel formed along the assembly taking place through at least one corresponding annular passage provided between adjacent annular flanges, said head being characterized in that in said annular passage, or in each of said annular passages, there is mounted to oscillate about a point located on the axis of the head a ring comprising on the one hand an internal lateral surface and an external lateral surface in the form of concentric spherical zones which are centered on said axis and abut on bearing surfaces of complementary configuration provided on the upper flange and the lower flange, respectively, which frame the ring, and, on the other hand, an annular beveled surface connecting the lower edges of said internal and external lateral surfaces, and in that said internal ring surface, said beveled surface and said complementary surface of the lower flange which bound said annular passage make wide obtuse angles with one another and are steeply inclined toward said axis and toward the outlet end of the head.

The extrusion die may likewise comprise two lateral surfaces in the form of concentric spherical zones centered on said axis and abutting on bearing surfaces of complementary configuration provided on the two flanges framing the die. Such a die may be mounted on an extrusion head comprising a ring-type adjusting means or on a conventional extrusion head not equipped with such an adjusting means.

An adjusting means is provided for controlling the oscillation of the ring or rings and of the extrusion die. While this adjusting means may be disposed laterally, in a preferred embodiment of the invention it is located at the end of the head which is opposite the die.

Because of the special configuration of the bearing surfaces and of the surfaces of the ring or rings, all of the dead spaces which in the prior-art extrusion head form recessed or projecting surface elements in the path of the material are replaced by wide obtuse angles with sides that are inclined toward the extrusion die and therefore cannot hold back material.

On the other hand, since the adjusting means can be located in the rear of the coextrusion head, it is accessible at all times while the machine is in operation, and it becomes possible to install remote-control devices such as jacks, either for manual control providing time savings and greater safety for the operators, or for continuous control based on a means for the detection of the geometric properties of the preform, for example, a proportional-action cell mounted at the outlet end of the coextrusion head. Such a device will relieve the adjuster of monitoring the preform, particularly during startup, before the thermal equilibrium of the machines is reached.

The invention will now be described, by way of example but not of limitation, with reference to the accompanying drawings, wherein:

FIGS. 1A to 1F show details from FIG. 1 on an enlarged scale;

FIGS. 2G and 2H show details from FIG. 2 on an enlarged scale;

Figure 1:
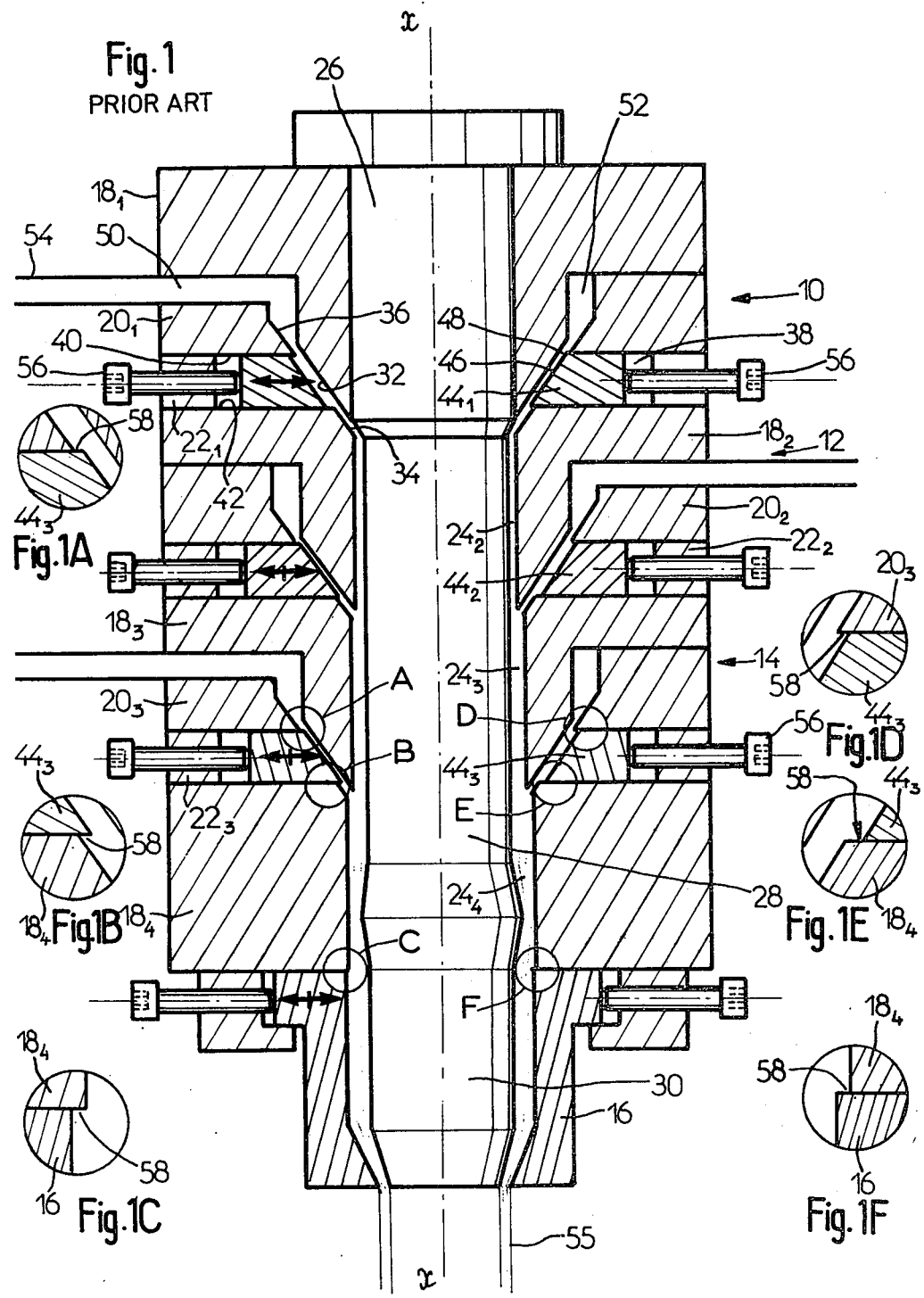
FIG. 1 is an axial sectional view of a prior-art coextrusion head.
Figure 2:
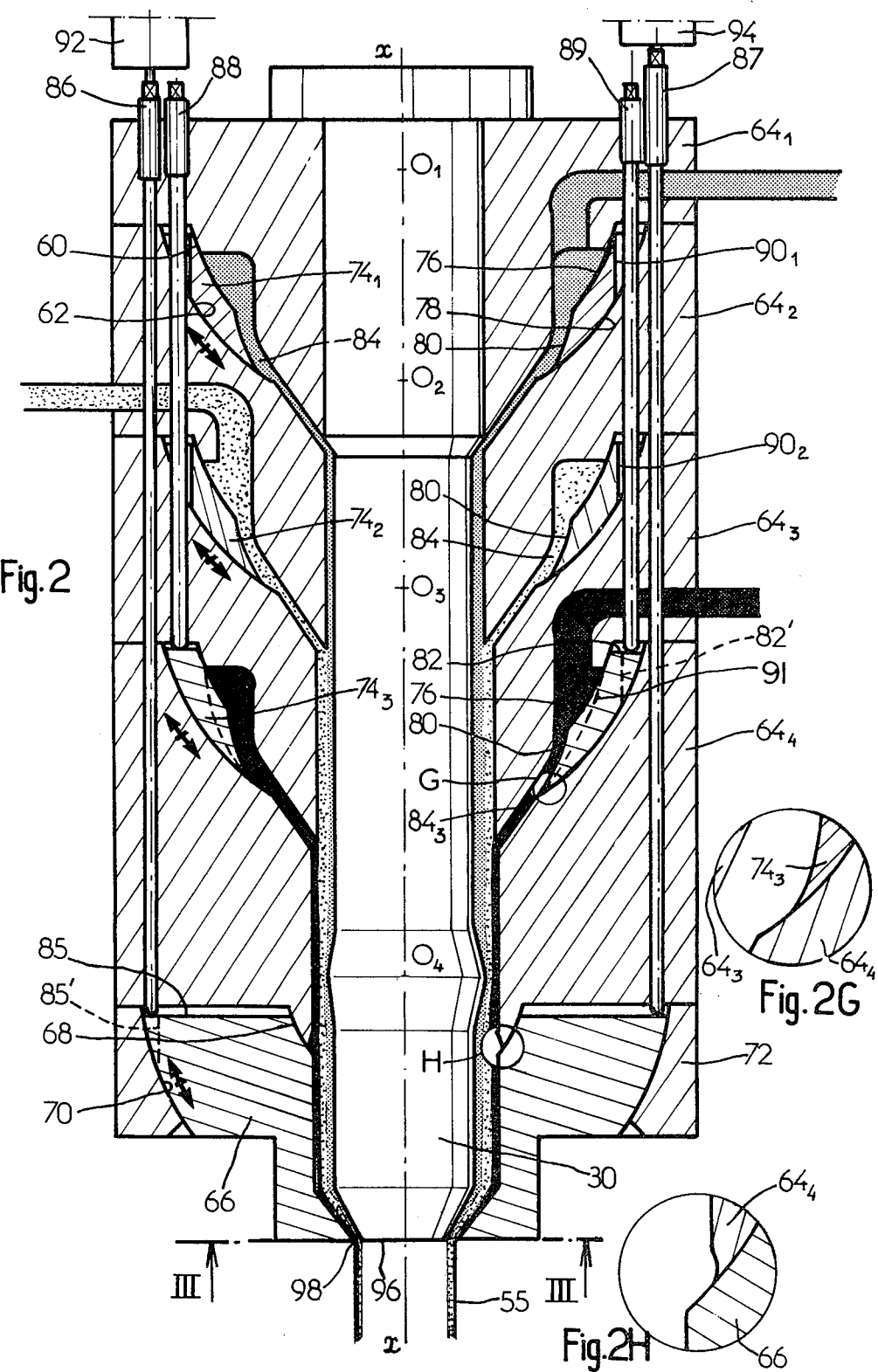
FIG. 2 is a sectional view of the coextrusion head in accordance with the invention.

The prior-art extrusion head illustrated in FIG. 1 and that of the invention, shown in FIG. 2, are intended for the extrusion of a three-layer parison, but the description which follows obviously is applicable to both the simple extrusion of a single-layer parison and to the coextrusion of a parison having more than one layer.

Referring now to FIG. 1, the prior-art coextrusion head comprises, from top to bottom, an upper level 10, a middle level 12, a lower level 14 and an extrusion die 16. Each of these levels comprises an annular T-shaped flange 18 and two flat annular flanges 20 and 22, disposed one on top of the other. The flanges of the upper level are designated by the subscript 1, those of the middle level by the subscript 2, and those of the lower level by the subscript 3. An annular base flange $18_4$ is fixed under the flange $18_3$.

All of these flanges as well as the extrusion die 16 have bores which are centered on the same axis x—x and are traversed with clearance by a stationary torpedo 26 comprising a mandrel support 28 and a mandrel 30 and defining with said bores a tubular channel $24_2$ to $24_4$ whose width increases from one T-shaped flange to the next.

The flanges 18 of each level are provided at their center base with a frustoconical wall 32 that is inclined toward the x—x axis and toward the extrusion die, and on the upper rim of their bore with a frustoconical beveled surface 34 of the same conicity as the wall 32.

The flat flange 20 of each level is disposed below the associated flange 18 and has an inside diameter that is considerably larger than that of the latter 18. Its bore is bounded by a frustoconical wall 36 disposed in the extension of the beveled surface 34 of the flange 18 of the next-lower level. The frustoconical walls 34 and 36 are opposite the furstoconical wall 32 of the flange 18.

The flat flange 22 of each level is interposed between the flange 20 of the same level and the flange 18 of the next-lower level, and its inside diameter is larger than that of the flange 20 so that an annular space 38 is formed which is bounded at the top by the horizontal bottom surface 40 of the flange 20, at the bottom by the horizontal top surface 42 of the flange 18 of the adjacent level, and internally by the frustoconical wall 32 of the flange 18 of the same level.

In each of these annular spaces 38 there is inserted, with very little play, an adjusting ring 44 provided with a frustoconical bore 46 that is dimensioned so that when the ring is centered on the x—x axis the wall of said bore exactly complements the frustoconical walls 34 and 36 of the flanges 20 and 18 which frame the centering ring 44, thus forming a continuous frustoconical surface located opposite the frustoconical wall 32 of the flange 18 of the same level. This surface forms with the opposite wall 32 a narrow frustoconical tubular passage 48 which communicates with the center channel 24.

Each of the flanges 20 forms a passage 50 which terminates in an annular chamber 52 that is connected to the tubular passage 48. A feed conduit 54 for the material to be extruded is connected to the passage 50. Thus a single-layer tube of material forms in the channel $24_2$, and at each of the succeeding levels a new layer is added so that at the outlet end of the extrusion die 16 a three-layer parison 55 is obtained.

In the embodiment illustrated in FIG. 1, the upper level 10 is fed from the left, the middle level from the right, and the lower level from the left. As has been pointed out earlier, the material has a tendency to distribute itself nonuniformly around the tubular passages 48. To overcome this drawback, the adjusting rings 44 may be displaced horizontally in a direction promoting uniform distribution. In the case of FIG. 1, the ring $44_1$ has been moved off center toward the left and the rings $44_2$ and $44_3$ have been moved toward the right. This is done by means of adjusting screws 56 which by their ends bear on the external surface of the rings 44. The extrusion die 16 can be shifted in the same manner by means of screws.

However, as is apparent from the enlarged detail views of FIGS. 1A to 1F, when the rings or the die are off center, setbacks 58 forming sharp corners in the path of the material will appear, and these will entail the drawbacks referred to earlier. Moreover, the screws 56 are not readily accessible while the machine is in operation since they are located in proximity to reciprocating or rotary mold-supporting elements or parison transfer means.

In accordance with the invention, all these drawbacks are overcome by the use of an extrusion head such as shown in FIG. 2. The description of the head for coextrusion of a three-layer parison which follows obviously is translatable to the case of simple single-layer extrusion or of multi-layer coextrusion with a number of layers other than three.

The coextrusion head of FIG. 2 differs from that of FIG. 1 in the following respects:

The bearing surfaces are formed by concentric spherical zones 60 and 62 which are steeply inclined toward the base and toward the x—x axis. These spherical zones have the same center ($O_1$, $O_2$ and $O_3$ for the upper, middle and lower level, respectively) located on the x—x axis and are formed by the contiguous walls of two adjacent flanges, for example, $64_1$ and $64_2$. The extrusion die 66 is likewise guided by two bearing surfaces 68 and 70 in the form of spherical zones centered at $O_4$ on the x—x axis and steeply inclined toward the base and toward said axis. These bearing surfaces are formed by the lower portion of the flange $64_4$ and by the inner wall of a flange 72.

Each of the centering rings 74 comprises two walls 76 and 78 in the form of spherical zones having the same center as the contiguous bearing surfaces 60 and 62 and bearing with slight play on said bearing surfaces; a beveled surface 80 in the form of a spherical, conical, toric or ogival zone connecting the lower edges of the walls 76 and 78 and having a steep inclination toward the base and toward the x—x axis; and a substantially horizontal upper wall 82. With the contiguous wall of the preceding flange, the beveled surface 80 defines an annular passage 84. The extrusion die 66 is similarly bounded by two walls in the form of spherical zones which bear with slight play on the bearing surfaces 68 and 70, and by a horizontal surface 85.

The result in accordance with the invention is that the material encounters no dead spaces over its path in which it might stagnate. Rather, all setbacks, for example, those shown in detail in FIGS. 2G and 2H, form wide obtuse angles with walls receding downwardly over which the material slips.

Of course, the same result is obtained when the beveled surface 80 extends over the entire uncovered portion of the wall 76, as shown in FIG. 2 by dashed lines at 91.

The adjusting means for the position of the rings $74_1$, $74_2$ and $74_3$ and of the extrusion die 66 are located in the rear of the coextrusion head and therefore are accessible even while the extrusion head is in operation.

These adjusting means may be three screws, for example, spaced 120 degrees apart over the periphery of the same circle, or by two screws and a return-spring mechanism. The screws may be actuated manually or by jacks. Jacks may be used in their place. These jacks are merely one example of remote-control means which may be actuated by a means for detection of the geometric properties of the preform.

Only the jack rods 86 and 87 and the jack cylinders 92 and 94 associated with the extrusion die 66 as well as the jack rods 88 and 89 associated with the ring $74_3$ are shown in FIG. 2 in order to keep that figure uncluttered.

The jack rods 86 and 87 traverse the flanges $64_1$, $64_2$, $64_3$ and $64_4$ or extend externally and bear by their ends on the horizontal surface 85 of the extrusion die 66 or its geometric extension.

The jack rods 88 and 89 traverse the flanges $64_1$, $64_2$ and $64_3$ as well as vertical bores $90_1$ and $90_2$ drilled through the rings $74_1$ and $74_2$, respectively, and bear by their ends on the top surface 82 of the ring $74_3$.

The coextrusion head in accordance with the invention is adjusted by the following procedure:

Assuming that the rings $74_1$ to $74_3$ and the extrusion die 66 are initially positioned so that the x—x axis is the axis of symmetry, each annular passage 84 then is of constant width over its periphery. If an irregularity is observed in one of the layers of the parison 55 emerging from the extrusion die 66, this defect is eliminated by acting in a given direction on the screws or jacks associated with the ring which forms that layer. For example, if the outermost layer of the parison 55 is thicker along a generatrix located on the right in FIG. 2, the jack rod $8g$ is driven down after the two other jack rods 88 have been pulled back. This results in a clockwise tilting motion of the ring $74_3$ about the point $O_3$, the ring being guided in this motion by the contiguous bearing surfaces on the adjacent flanges 64, and hence in a constriction of the channel $84_3$ on the right side of the figure along with an enlargement of the same channel on the left side.

Obviously the screws or jacks may be disposed laterally, as in the prior-art extrusion head, and will then act on the cylindrical surfaces 82' and 85' of the rings and of the extrusion die 66.

The sections of the torpedo 26 and of the bores of the flanges are circular in all cases. This, however, is not necessarily true of the end 96 of the mandrel 30 and of the discharge edge 98 of the extrusion die 66.

Figure 3:
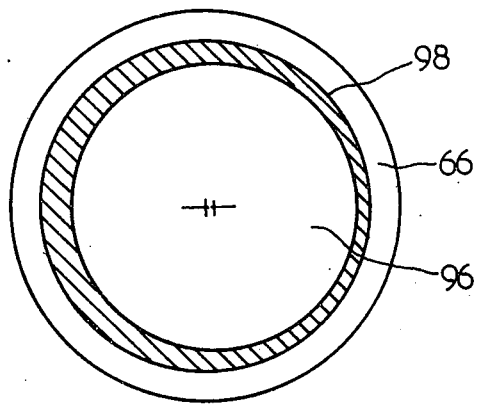
FIG. 3 is a sectional view taken along the line III—III in FIG. 2.

FIG. 3 illustrates the case where said end 96 and said edge 98 are circular.

Figure 4:
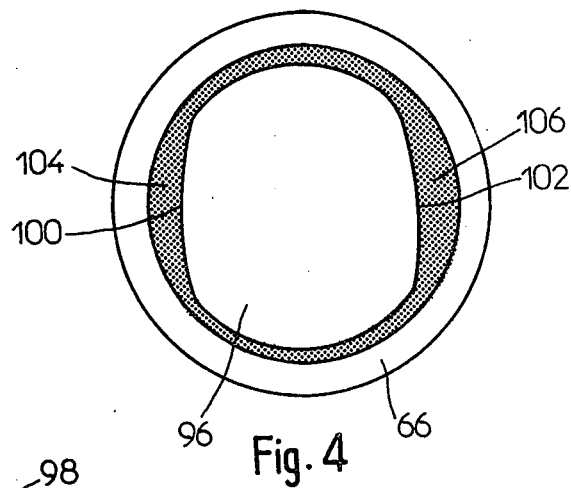
FIGS. 4 and 5 show modifications of the ends of the extrusion die and of the mandrel.
Figure 5:
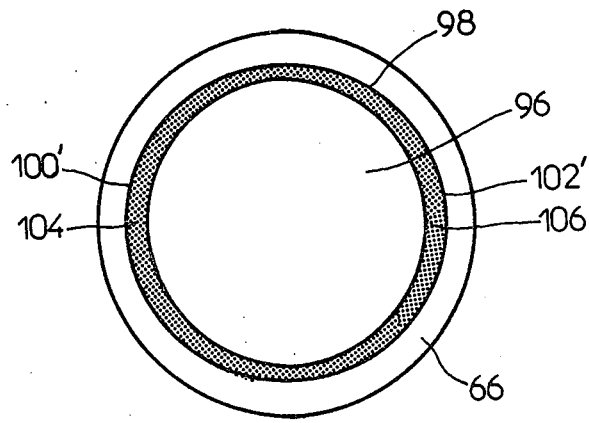

In the embodiments of FIGS. 4 and 5, further machining has been done on one or more generatrices 100 and 102 (100' and 102') of the end of the mandrel or of the discharge edge 98 of the extrusion die for the purpose of obtaining reinforced-material zones 104 and 106 on one or more generatrices of the preform. This expedient is applicable to the head in accordance with the invention as to all conventional heads. It permits the wall of the preform to be strengthened in areas where the article to be molded should be thicker. This is the case with hollow objects of square or rectangular section, for example, where the corners in particular must be reinforced to resist shock and stresses.

Figure 6:
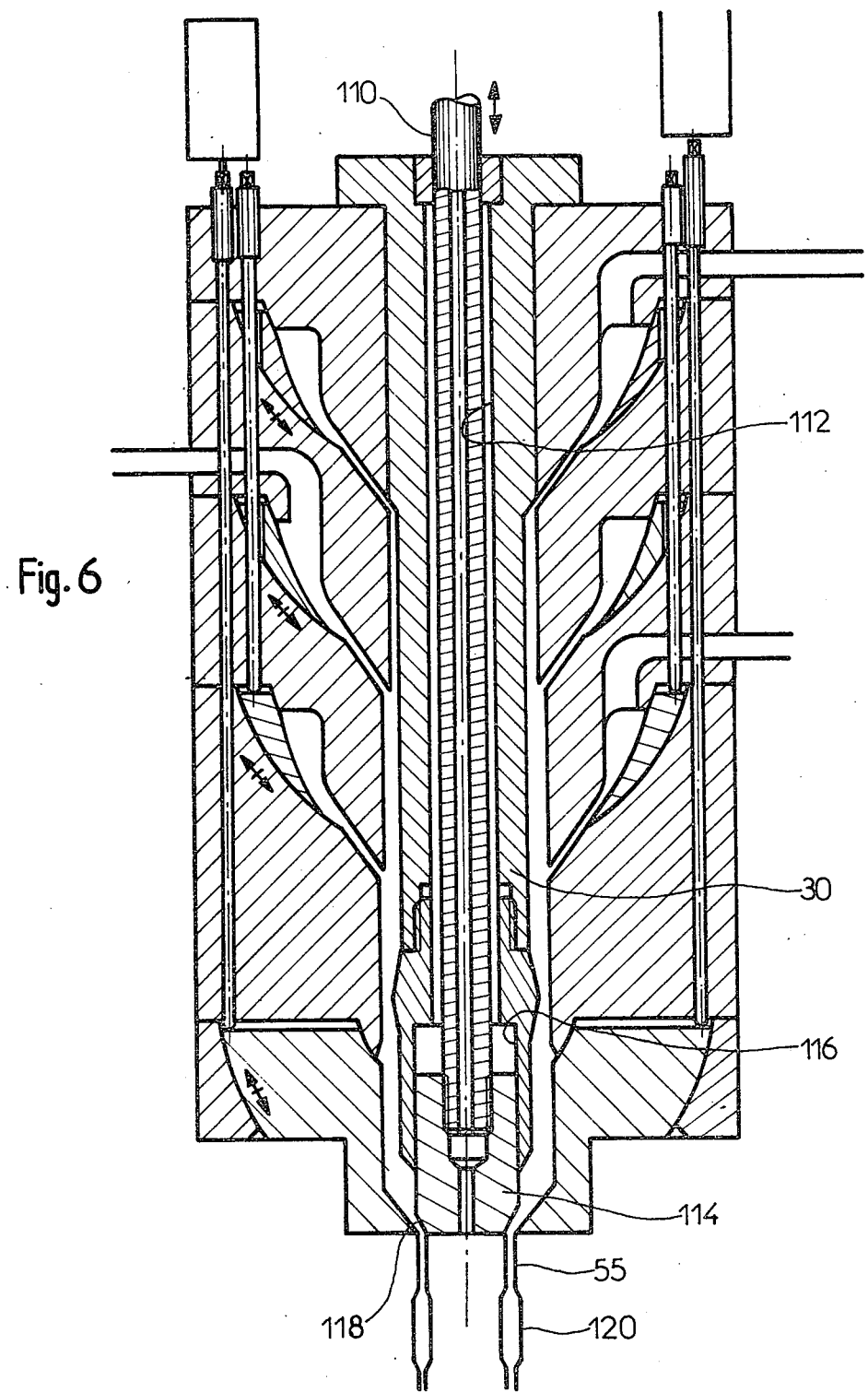
FIG. 6 is an axial sectional view of an extrusion head in accordance with another embodiment of the invention.

Shown in FIG. 6 is a modification of the embodiment of the head of FIG. 2 wherein the ring-type adjusting system is combined with a means, known per se, for varying the thickness of the preform. Said means consists of a rod 110 which traverses from top to bottom an axial bore 112 provided in the torpedo 26. The lower end of the rod 110 is secured, by means of bolts, for example, to a mandrel 114 which is mounted to slide in a bore 116 that is a continuation of the bore 112. The rod 110 imparts to the mandrel 114 a reciprocating motion that is programmed through a hydraulic, pneumatic, mechanical, electrical or other drive system capable of acting on the upper end of the rod.

As a result, the clearance between the frustoconical wall 118 of the mandrel 114 and the discharge edge 98 of the extrusion die varies in thickness. A preform 55 of programmed thickness is thus obtained which has thickness variations that permit the quantity of the material to be optimized on the basis of the requirements of the finished article.

I claim:

1. In a head for the extrusion of a tubular parison, formed of at least one layer of material useful for the purpose of forming hollow objects or tubular films, said head being an assembly of parts formed by a stack of internally circular annular flanges which are centered on the general axis of the head and are axially traversed with clearance by a torpedo having as an extension a mandrel support which serves to support and guide a mandrel, the assembly forming a tubular channel beyond said torpedo to accommodate the flow of material to be extruded, at least one annular passage formed between adjacent annular flanges and in open communication with said channel, the improvement comprising a ring mounted in each such annular passage in a manner adapted to oscillate about a point located generally on the central axis of the head, each such ring comprising on the one hand a lateral internal surface and an external surface in the form of concentric spherical zones which are centered on said axis and which abut on bearing surfaces of complementary configuration which are provided on the upper flange and on the lower flange, respectively, which frame said ring, and on the other hand an annular beveled surface connecting the lower edges of said internal and external surface of the ring, said beveled surface and said complementary surface of the lower flange which externally bound said respective annular passage make wide obtuse angles with one another at all normal operative positions of said ring and are steeply inclined toward said axis and toward the outlet end of the head.

2. An extrusion head according to claim 1, further comprising the extrusion die mounted at the end of said stack of flanges and traversed by said mandrel, said die has two lateral surfaces in the form of concentric spherical zones which are centered on said axis and abut on respective bearing surfaces of complementary configuration provided on the two adjacent flanges which frame the extrusion die.

3. An extrusion head according to claim 1, comprising adjusting means for controlling the oscillation of each ring and of the extrusion die, respectively.

4. An extrusion head according to claim 1, wherein said beveled surface has a form chosen from the shapes consisting of a conical, spherical, toric and ogival zone.

5. An extrusion head according to claim 3, wherein each such adjusting ring and the extrusion die comprise a respective annular upper surface which is perpendicular to the general axis of the head, and said adjusting means is located at the end of the head which is opposite the extrusion die and acts on said respective upper surfaces.

6. An extrusion head according to claim 1, wherein each such adjusting ring and the extrusion die individually comprise a respective cylindrical surface directed outwardly and having as its axis the general axis of the head, and said adjusting means is disposed laterally about the head and acts on said cylindrical surfaces.

7. An extrusion head according to claim 3, 5, or 6, wherein said adjusting means comprise rods respectively engaging each of the rings and the extrusion die.

8. An extrusion head according to claim 7, wherein said rods traverse bores which are parallel to the general axis of the head and are provided in the flanges and in the ring or rings disposed above the respective ring or extrusion die.

9. An extrusion head according to claim 8, wherein the adjusting means comprises sets of at least three adjusting rods for each of the rings and the extrusion die, respectively.

10. An extrusion head according to claim 8, wherein the adjusting means comprises sets of two rods and a return means for each ring and for the extrusion die, respectively.

11. An extrusion head according to claim 7, wherein the rods are actuated by remote-control means controlled by means for the detection of the geometric properties of the formed object.

12. An extrusion head according to claims 8, 9, or 10, wherein the rods are actuated by remote-control means controlled by means for the detection of the geometric properties of the formed object.

13. An extrusion head according to claim 2, wherein the end of the mandrel and the discharge edge of the extrusion die are circular.

14. An extrusion head according to claim 2, wherein the end of the mandrel is provided with one or more beveled surfaces which define, together with the discharge edge of the extrusion die, enlarged passages adapted to give rise to reinforced areas on the formed object.

15. An extrusion head according to claim 2, wherein the discharge edge of the extrusion die is provided with one or more recesses which together with the mandrel define enlarged passages adapted to give rise to reinforced areas on the formed object.

16. An extrusion head according to claim 2, further compromising a means for variation of the thickness of the formed object comprising a rod which traverses an axial bore provided in the torpedo and whose lower end carries the mandrel which terminates in a frustoconical surface, and means adapted axially to reciprocate said rod and the mandrel to which it is secured.

17. An extrusion head according to claim 1 for extrusion of a multilayered tubular parison, further comprising a plurality of said rings, each with an associated annular passage formed between associated annular flanges, said rings aligned seriatim along said axis.

* * * * *